(12) United States Patent
Kim et al.

(10) Patent No.: US 10,208,680 B2
(45) Date of Patent: Feb. 19, 2019

(54) ENGINE PROVIDED WITH CONTINUOUS VARIABLE VALVE TIMING APPARATUS AND CONTINUOUS VARIABLE VALVE DURATION APPARATUS

(71) Applicant: Hyundai Motor Company, Seoul (KR)

(72) Inventors: Woong Kim, Hwaseong-si (KR); Dongheon Park, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 136 days.

(21) Appl. No.: 15/265,724

(22) Filed: Sep. 14, 2016

(65) Prior Publication Data
US 2017/0167395 A1    Jun. 15, 2017

(30) Foreign Application Priority Data

Dec. 11, 2015 (KR) ........................ 10-2015-0177472

(51) Int. Cl.
*F01L 1/34* (2006.01)
*F02D 13/02* (2006.01)
*F01L 1/053* (2006.01)
*F01L 1/344* (2006.01)

(52) U.S. Cl.
CPC .......... *F02D 13/0207* (2013.01); *F01L 1/053* (2013.01); *F01L 1/34403* (2013.01); *F01L 2001/0537* (2013.01); *F01L 2201/00* (2013.01); *F01L 2740/00* (2013.01); *Y02T 10/18* (2013.01)

(58) Field of Classification Search
CPC ................... F01L 1/053; F01L 1/34403; F01L 2001/0537; F01L 2201/00; F02D 13/0207; Y20T 10/18
USPC ........................................... 123/90.15, 90.17
See application file for complete search history.

(56) References Cited

U.S. PATENT DOCUMENTS 6,792,914 B2 *   9/2004   Fuwa .................. F02D 13/0253
                                                                 123/90.15

FOREIGN PATENT DOCUMENTS

| JP | 2003-269124 A | 9/2003 |
| JP | 2005-502808 A | 1/2005 |
| JP | 2009-228667 A | 10/2009 |
| JP | 5582195 B2 | 9/2014 |

* cited by examiner

*Primary Examiner* — Ching Chang
(74) *Attorney, Agent, or Firm* — Morgan, Lewis & Bockius LLP

(57) ABSTRACT

An engine may include an electric continuously variable valve timing apparatus for adjusting opening timing of an intake valve provided at a cylinder head, and a continuously variable valve duration apparatus for adjusting duration of exhaust valve provided at the cylinder head.

18 Claims, 20 Drawing Sheets

(a)  (b)  (c)  (d)

ENGINE PROVIDED WITH CONTINUOUS VARIABLE VALVE TIMING APPARATUS AND CONTINUOUS VARIABLE VALVE DURATION APPARATUS

CROSS-REFERENCE TO RELATED APPLICATION

The present application claims priority to Korean Patent Application No. 10-2015-0177472, filed Dec. 11, 2015, the entire contents of which is incorporated herein for all purposes by this reference.

BACKGROUND OF THE INVENTION

Field of the Invention

The present invention relates to an engine provided with a Continuously variable valve timing apparatus (CVVT) and a Continuously variable valve duration apparatus (CVVD). More particularly, the present invention relates to an engine provided with a CVVT that can change timing of a intake valve and a CVVD that can change duration of exhaust valve according to an engine operation.

Description of Related Art

An internal combustion engine generates power by burning fuel in a combustion chamber in an air media drawn into the chamber. Intake valves are operated by a camshaft in order to intake the air, and the air is drawn into the combustion chamber while the intake valves are open. In addition, exhaust valves are operated by the camshaft, and a combustion gas is exhausted from the combustion chamber while the exhaust valves are open.

Optimal operation of the intake valves and the exhaust valves depends on a rotation speed of the engine. That is, an optimal lift or optimal opening/closing timing of the valves depends on the rotation speed of the engine. In order to achieve such optimal valve operation depending on the rotation speed of the engine, various researches, such as designing of a plurality of cams and a continuous variable valve lift (CVVL) that can change valve lift according to engine speed, have been undertaken.

Further, in order to achieve such an optimal valve operation depending on the rotation speed of the engine, research has been undertaken on a continuously variable valve timing (CVVT) apparatus that enables different valve timing operations depending on the engine speed. The general CVVT may change valve timing with a fixed valve opening duration.

However, the general CVVL and CVVT are complicated in construction and are expensive in manufacturing cost.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an engine provided with a CVVT that can change timing of an intake valve and a CVVD that can change duration of an exhaust valve according to an engine operation.

According to various aspects of the present invention, an engine may include an electric continuously variable valve timing apparatus for adjusting opening timing of an intake valve provided at a cylinder head, and a continuously variable valve duration apparatus for adjusting duration of exhaust valve provided at the cylinder head.

The electric variable valve timing apparatus may include an intake camshaft, first and second intake cam portions having two intake cams are formed thereto, the intake camshaft being inserted into the first and second intake cam portions, wherein relative phase angles with respect to the intake camshaft are variable, first and second intake inner brackets transmitting rotation of the intake camshaft to the first and second intake cam portions respectively, first and second intake slider housings having the first and second intake inner brackets rotatably inserted therein, respectively, and having relative positions with respect to the intake camshaft that are variable, an intake cam cap rotatably supporting the first and second intake cam portions together with a cylinder head, wherein the intake slider housings are slidably mounted to the intake cam cap, an intake control shaft disposed parallel to the intake camshaft and selectively moving the first and the second intake slider housings, and an intake control portion selectively rotating the intake control shaft so as to change positions of the intake inner brackets.

The engine may further include an intake rotation ring mounted to the intake camshaft and having an intake ring key transmitting the rotation to the first intake cam portion and the second intake cam portion, respectively, in which an intake cam key may be formed to the first and second intake cam portions respectively, and the rotation of the intake rotation ring may be transmitted to the first and second intake cam portions through the first and second intake inner brackets respectively.

The engine may further include first intake pins having an intake ring key slot, each intake ring key slidably insertable to the intake ring key slots, and second intake pins having a cam key slot, each intake cam key slidably insertable to the intake cam key slots, in which a first intake sliding pin hole and a second intake sliding pin hole, of which the first intake pin and the second intake pin are inserted into respectively, are formed on the intake inner brackets.

The first intake pin and the second intake pin may be formed in a circular cylinder shape, and the first intake sliding pin hole and the second intake sliding pin hole may be formed for the first intake pin and the second intake pin to be rotated within the first intake pin and the second intake pin.

Portions of the first intake sliding pin hole and the second intake sliding pin hole may be open for movements of the intake ring key and the intake cam key to be uninterrupted.

The engine may further include an intake bearing inserted between the intake slider housing and the first and the second intake inner brackets.

An intake cam cap connecting portion may be formed between the two intake cams of the intake cam portions, and the intake cam cap connecting portion may be rotatably disposed between the intake cam cap and the cylinder head.

The intake control portion may include an intake worm wheel connected to the intake control shaft, an intake worm gear engaged with the intake worm wheel, and an intake control motor selectively rotating the intake worm gear, an intake eccentric protrusion may be formed at an end of the intake control shaft, and an intake control hole where the intake eccentric protrusion is inserted therein is formed on the intake slider housings, and the intake slider housings move according to operation of the intake control motor.

The engine of may further include an intake sensor device detecting movements of the intake slider housings, in which the intake sensor device may include an intake sensor plate mounted to the intake control shaft, and an intake sensor detecting rotations of the intake sensor plate.

The continuously variable valve duration apparatus may include an exhaust camshaft, first and second exhaust cam portions of an exhaust cam is formed thereto respectively, of which the exhaust camshaft is inserted thereto and of which relative phase angles with respect to the exhaust camshaft are variable, first and second exhaust inner brackets transmitting rotation of the exhaust camshaft to the first and second exhaust cam portions respectively, first and second exhaust slider housings of which the first and second exhaust inner brackets are rotatably inserted thereto and of which relative positions with respect to the exhaust camshaft are variable, an exhaust cam cap rotatably supporting the first and second exhaust cam portions and of which each exhaust slider housing is slidably mounted thereto, an exhaust control shaft disposed parallel to the exhaust camshaft and engaged with the first and second exhaust slider housings for selectively moving the first and second exhaust slider housings, and an exhaust control portion selectively rotating the exhaust control shaft for changing positions of the exhaust inner brackets.

An exhaust cam key may be formed to the first and second exhaust cam portions respectively, an exhaust first sliding hole may be formed to the first and second exhaust inner brackets respectively, and the continuous variable valve duration apparatus may further include an exhaust cam key pin of which an exhaust cam key slot where the exhaust cam key is slidalby inserted therein is formed thereto and the exhaust cam key pin rotatably inserted into the each exhaust first sliding hole.

An exhaust second sliding hole may be formed to the first and second exhaust inner brackets respectively, and the continuous variable valve duration apparatus may further include a plurality of exhaust camshaft pin connected to the exhaust camshaft, and an exhaust slider pin of which an exhaust camshaft pin slot where the exhaust camshaft pin is slidably inserted therein is formed thereto and the exhaust slider pin rotatably inserted into the each exhaust second sliding hole.

An exhaust shaft hole where the exhaust control shaft is inserted into may be formed on the exhaust cam cap.

An exhaust guide slot may be formed to the exhaust cam cap, an exhaust guide shaft inserted into the exhaust guide slot and on which an exhaust rack gear is formed may protrude from the exhaust slider housing, an exhaust pinion gear may be formed on the exhaust control shaft and engaged with the exhaust rack gear, and the positions of the exhaust slider housings may be changed according to rotation of the exhaust control shaft.

The engine may further include an exhaust slider housing bearing disposed between the exhaust slider housing and the first and second exhaust inner brackets respectively.

The exhaust cam may be formed as a pair, an exhaust cam cap connecting portion may be formed between the pair of exhaust cams of the exhaust cam portions, and the exhaust cam cap may rotatably support the exhaust cam cap connecting portion.

The exhaust control portion may include an exhaust worm wheel connected to the exhaust control shaft, an exhaust worm gear engaged with the exhaust worm wheel, and an exhaust control motor selectively rotating the exhaust worm gear.

The engine may further include an exhaust partition disposed within the first and second exhaust slider housings respectively for preventing from interrupting of the rotations of the exhaust inner brackets. Since the engine according to various embodiments of the present invention includes the electric CVVT adjusting opening timing of the intake valve, responsiveness and reliability are improved when the intake valve is operated.

Further, since the engine according to various embodiments of the present invention includes the CVVD adjusting duration of the exhaust valve, fuel consumption is improved and emission is stabilized.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
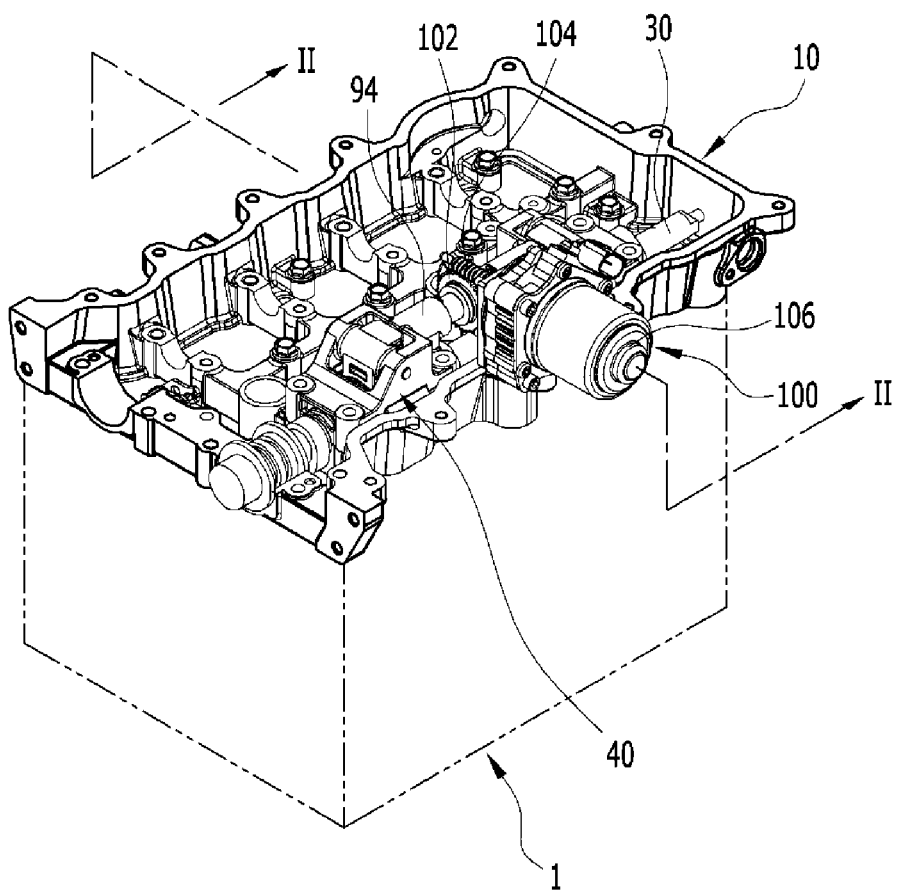
FIG. 1 is a perspective view of an engine provided with a continuous variable valve timing apparatus according to an exemplary embodiment of the present invention.
Figure 11:
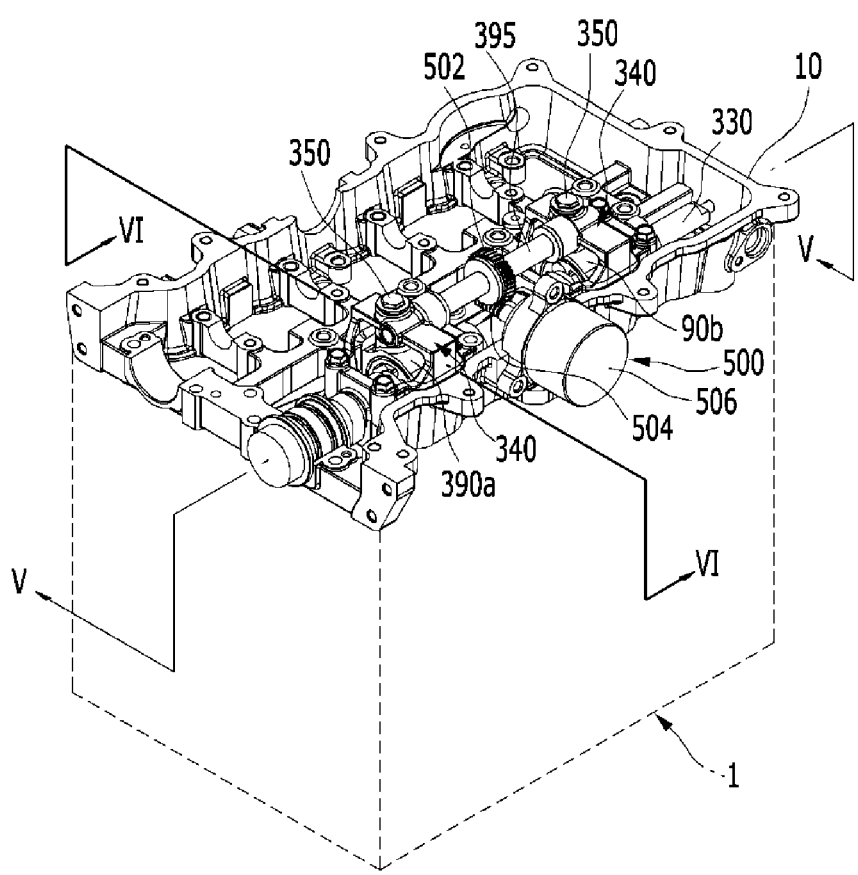
FIG. 11 is a perspective view of an engine provided with a continuous variable valve duration apparatus according to an exemplary embodiment of the present invention.

FIG. 1 is a perspective view of an engine provided with a continuous variable valve timing apparatus according to various embodiments of the present invention. FIG. 11 is a perspective view of an engine provided with a continuous variable valve duration apparatus according to various embodiments of the present invention.

As shown in FIG. 1 and FIG. 11, an engine according to various embodiments of the present invention includes a CVVT (continuously variable valve timing apparatus) that can adjust opening timing of an intake valve provided with a cylinder head and a CVVD (continuously variable valve duration apparatus) that can adjust duration of an exhaust valve provided with the cylinder head.

The CVVT (continuously variable valve timing apparatus) adjusting opening timing of the intake valve is an electric CVVT. Since the CVVT is realized as an electric CVVT, response speed can be improved when the opening timing of the intake valve is adjusted, and thus combustion stability of the engine can be obtained.

The CVVD adjusting duration of the exhaust valve is provided with the exhaust valve, the duration of the exhaust valve can be adjusted according to an operating region of the engine. For example, the duration of the exhaust valve is adjusted to be short during low speed region, and the duration of the exhaust valve is adjusted to be long during high speed region. As such, since the duration of the exhaust valve is adjusted according to the operating region, fuel consumption can be improved and emission can be stabilized.

Hereinafter, an electric CVVT (continuously variable valve timing apparatus) adjusting opening timing of the intake valve and a CVVD (continuously variable valve duration) adjusting duration of the exhaust valve will be described in detail with reference to accompanying drawings.

First, the electric CVVT (continuously variable valve timing apparatus) will be described in detail.

Figure 2:
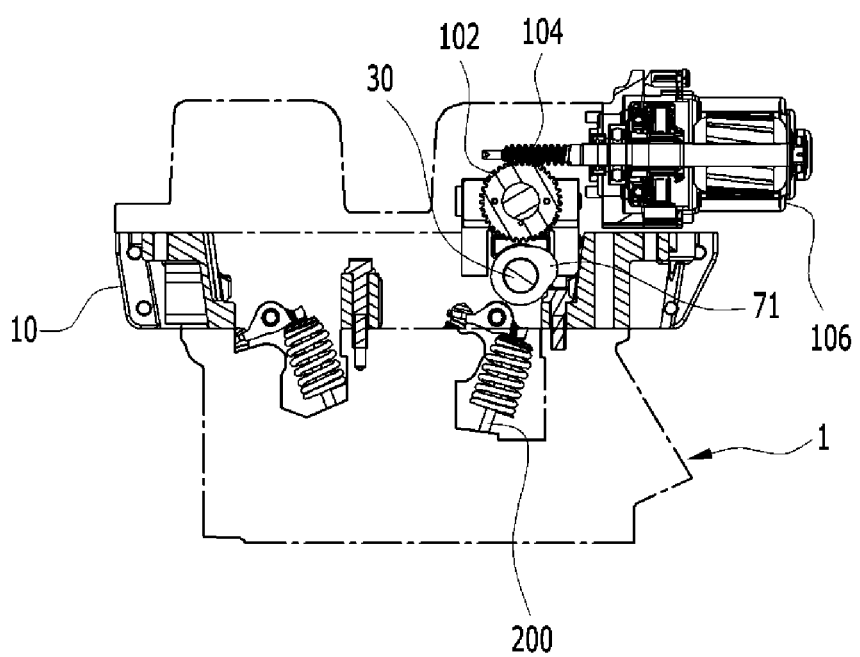
FIG. 2 is a cross-sectional view along a line II-II of FIG. 1.
Figure 3:
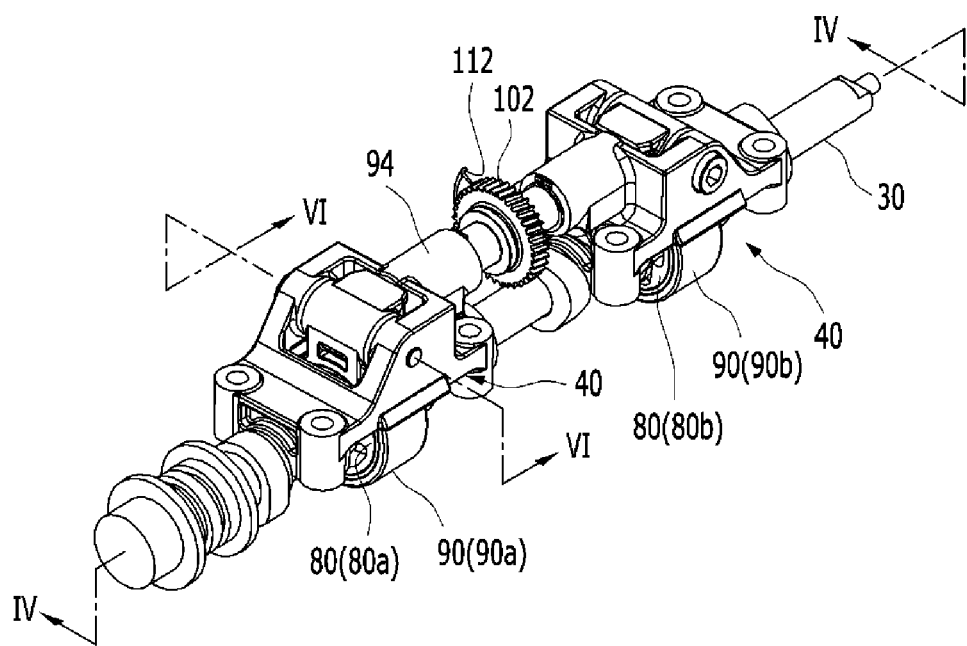
FIG. 3 is a perspective view of a continuous variable valve timing apparatus according to an exemplary embodiment of the present invention.
Figure 4:
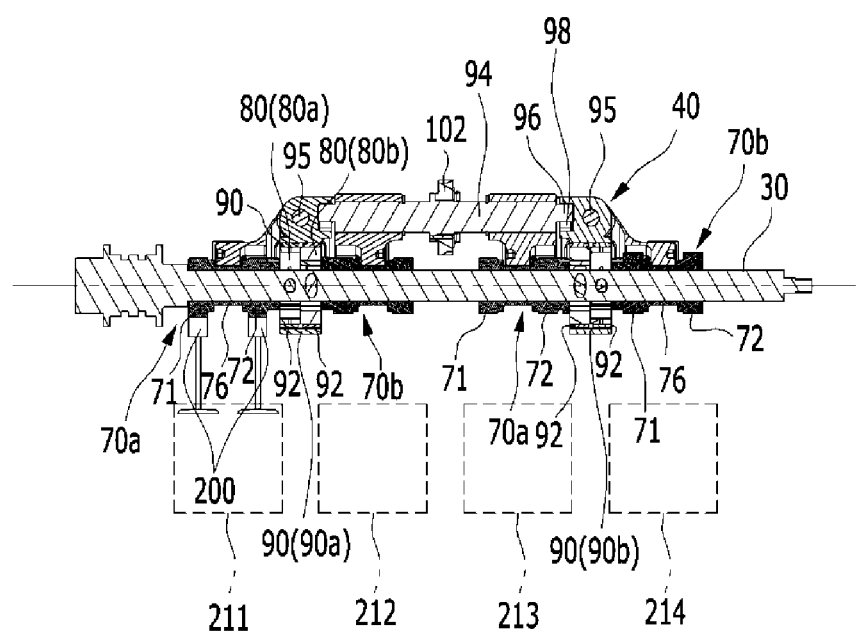
FIG. 4 is a cross-sectional view along a line IV-IV of FIG. 3.
Figure 5:
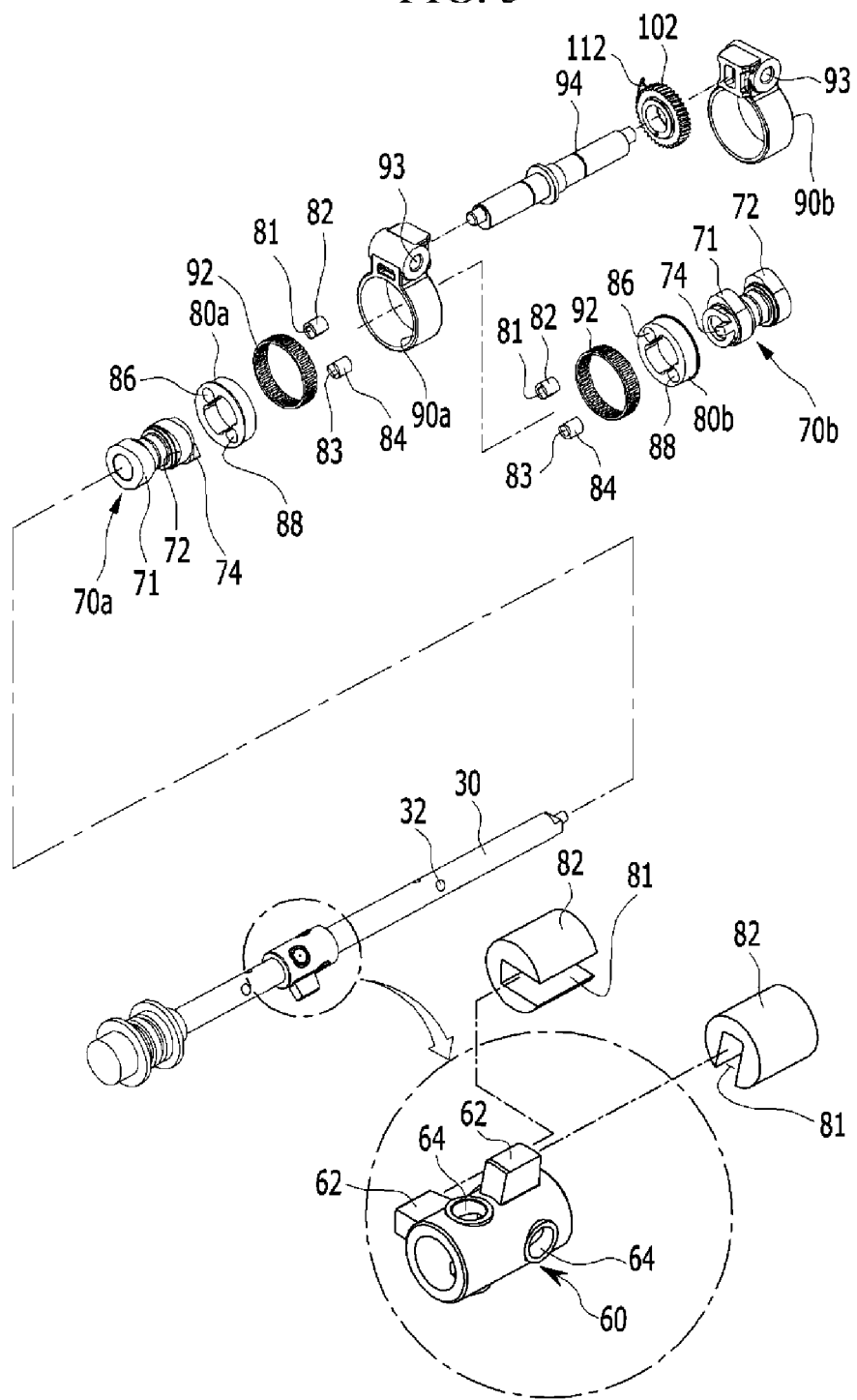
FIG. 5 is a partial exploded perspective view of a continuous variable valve timing apparatus according to an exemplary embodiment of the present invention.
Figure 6:
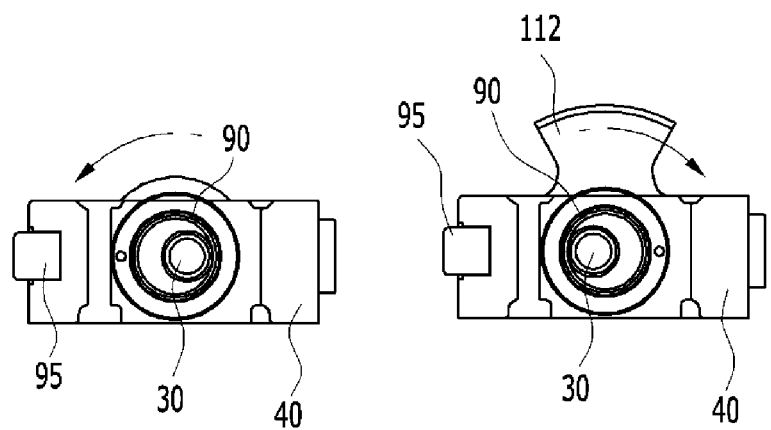
FIG. 6 is a cross-sectional view along a line VI-VI of FIG. 3.
Figure 7:
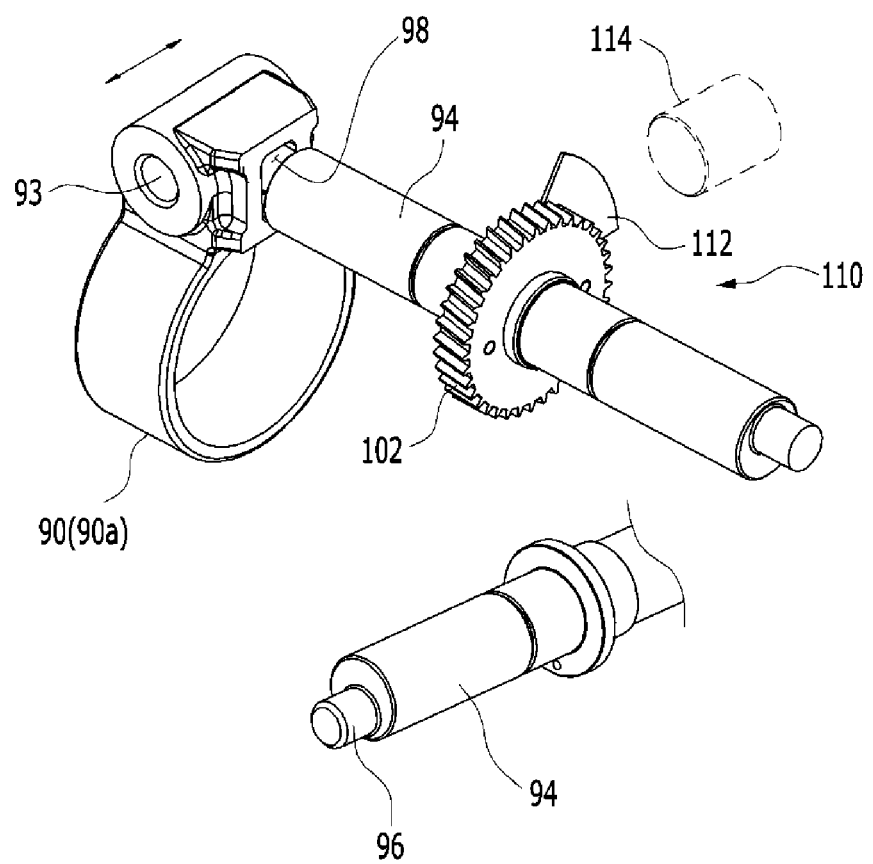
FIG. 7 is a drawing showing a slider housing and a control shaft applied to a continuous variable valve timing apparatus according to present invention.

FIG. 1 is a perspective view of an engine provided with a continuous variable valve timing apparatus according to various embodiments of the present invention. FIG. 2 is a cross-sectional view along a line II-II of FIG. 1. FIG. 3 is a perspective view of a continuous variable valve timing apparatus according to various embodiments of the present invention. FIG. 4 is a cross-sectional view along a line IV-IV of FIG. 3. FIG. 5 is a partial exploded perspective view of a continuous variable valve timing apparatus according to various embodiments of the present invention. FIG. 6 is a cross-sectional view along a line VI-VI of FIG. 3. FIG. 7 is a drawing showing a slider housing and a control shaft applied to a continuous variable valve timing apparatus according to various embodiments of the present invention.

Referring to FIG. 1 to FIG. 7, an engine according to various embodiments of the present invention includes an engine block 1, a cylinder head 10 and a continuously variable valve timing apparatus mounted to the cylinder head 10.

The electric continuously variable valve timing apparatus according to various embodiments of the present invention includes an intake camshaft 30, a first and a second intake cam portions 70*a* and 70*b* having two intake cams 71 and 72 are formed thereto, the intake camshaft 30 being inserted into the first and second intake cam portions 70*a* and 70*b*, wherein relative phase angles with respect to the intake camshaft 30 are variable, first and second intake inner brackets 80*a* and 80*b* transmitting rotation of the intake camshaft 30 to the first and second intake cam portions 70*a* and 70*b* respectively, first and second intake slider housings 90*a* and 90*b* having the first and second intake inner brackets 80*a* and 80*b* rotatably inserted thereinto, respectively, and having relative positions with respect to the intake camshaft 30 that are variable, an intake cam cap 40 rotatably supporting the first and second intake cam portions 70*a* and 70*b* together with a cylinder head 10, wherein the intake slider housings 90*a* and 90*b* are slidably mounted to the intake cam cap 40, an intake control shaft 94 disposed parallel with the intake camshaft 30 and selectively moving the first and the second intake slider housings 90*a* and 90*b*, and an intake control portion 100 selectively rotating the intake control shaft 94 so as to change positions of the intake inner brackets 80*a* and 80*b*.

The intake camshaft 30 is an intake camshaft.

In the drawing, the intake cam 71 and 72, for driving valves 200, is formed as a pair, but it is not limited thereto.

The engine includes a plurality of cylinders 211, 212, 213 and 214, and the plurality of the intake cam portions 70 are disposed corresponding to the each cylinder 211, 212, 213 and 214 respectively.

In the drawing, 4 cylinders are formed to the engine, but it is not limited thereto.

To the intake cam portions 70*a* and 70*b*, an intake cam cap connecting portion 76 for engaged with the intake cam cap 40 is formed between the first and the second intake cams 71 and 72. The cylinder head 10 and the intake cam cap 40 are connected with each other and the intake cam cap connecting portion 76 is rotatably disposed between the intake cam cap 40 and the cylinder head 10.

The intake cam 71 and 72 rotate and open the intake valve 200.

An intake rotation ring 60 of which an intake ring key 62 transmitting the rotation to the first intake cam portion 70*a* and the second intake cam portion 70*b* is formed respectively, is mounted to the intake camshaft 30 and an intake cam key 74 is formed to the first and second intake cam portions 70a and 70b respectively, and the rotation of the intake rotation ring 60 is transmitted to the first and second intake cam portions 70a and 70b through the first and second intake inner brackets 80a and 80b respectively.

The continuously variable valve timing apparatus may further include first intake pins 82 of which an intake ring key slot 81, the each intake ring key 62 is slidably inserted thereto, is formed thereto respectively and second intake pins 84 of which an intake cam key slot 83, the each intake cam key 74 is slidably inserted thereto, is formed thereto respectively, and an intake first sliding pin hole 86 and an intake second intake sliding pin hole 88, of which the intake first pin 82 and the second intake pin 84 are inserted thereto respectively, are formed to the intake inner brackets 80a and 80b.

An intake camshaft hole 32 and an intake rotation ring hole 64 is formed to the intake camshaft 30 and the intake rotation ring 60 respectively, and an intake connecting pin 66 is inserted into the intake camshaft hole 32 and the intake rotation ring hole 64 for the intake camshaft 30 to be connected with the intake rotation ring 60.

The intake first pin 82 and the first intake sliding pin hole 86 are formed as a circular cylinder shape and the first sliding pin hole 86 and the second intake sliding pin hole 88 are formed for the intake first pin 82 and the first intake sliding pin hole 86 to be rotated within thereto. Since the first intake pin 82, the first intake sliding pin hole 86, the first sliding pin hole 86 and the second intake sliding pin hole 88 are formed as a circular cylinder, thus wear resistance may be enhanced.

Also, productivity may be increased due to simple shapes of the first intake pin 82, the first intake sliding pin hole 86, the first intake sliding pin hole 86 and the second intake sliding pin hole 88.

Parts of the first intake sliding pin hole 86 and the second intake sliding pin hole 88 are opened for movements of the intake ring key 62 and the intake cam key 74 not to be interrupted.

An intake bearing 92 is inserted between the intake slider housing 90 and the intake inner bracket 80. Thus, rotation of the intake inner bracket 80 may be easily performed.

An intake guide hole 93 is formed to the each intake slider housing 90a and 90b, and wherein an intake guide rod 95 inserted into the intake guide hole 93 is connected with the intake cam cap 40 in order to guide movements of the intake slider housings 90a and 90b.

The intake control portion 100 includes an intake worm wheel 102 connected to the intake control shaft 94, an intake worm gear 104 engaged with the intake worm wheel 102 and an intake control motor 106 selectively rotating the intake worm gear 104. And an intake eccentric protrusion 96 is formed to an end of the intake control shaft 94, and an intake control hole 98 where the intake eccentric protrusion 96 is inserted therein is formed to the intake slider housings 90a and 90b, and the intake slider housings 90a and 90b move according to operation of the intake control motor 106.

As shown in FIG. 3 to FIG. 5, two first and two second intake cam portions 70a and 70b are sequentially disposed, two intake ring keys 62 are formed to the intake rotation ring 60, and rotation of one intake rotation ring 60 is transmitted to the first and the second intake cam portions 70a and 70b simultaneously.

For example, an engine with a first, second, third and fourth cylinders 211, 212, 213 and 214 may be provided with two intake rotation rings 60, two first and second intake cam portions 70a and 70b, two intake inner brackets 80a and 80b, two intake slider housings 90a and 90b and one intake control motor 106 and perform changing timing of each intake cam 71 and 72. Thus, the continuously variable valve timing apparatus according to various embodiments of the present invention may reduce numbers of elements, thus durability may be improved and operation stability may be obtained.

The continuously variable valve timing apparatus further includes an intake sensor device 110 detecting movements of the intake slider housings 90.

The intake sensor device 110 includes an intake sensor plate 112 mounted to the intake control shaft 94 and a intake sensor 114 detecting rotations of the intake sensor plate 112.

When the intake control shaft 94 moves according to rotation of the intake control motor 106, the intake sensor plate 112 mounted to the intake control shaft 94 rotates, the intake sensor 114 detects rotation of the intake sensor plate 112 and measures movements of the intake slider housings 90a and 90b.

Figure 8:
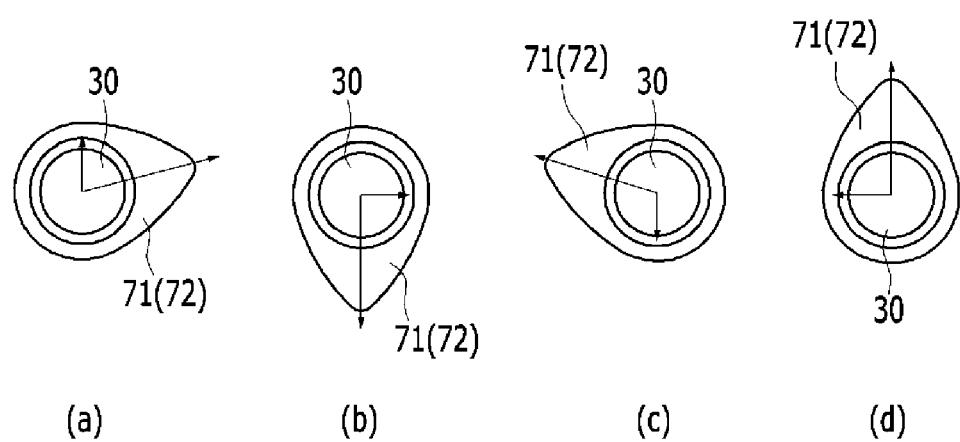
FIG. 8 and FIG. 9 are drawings showing mechanical motions of cams of a continuous variable valve timing apparatus according to an exemplary embodiment of the present invention.
Figure 9:
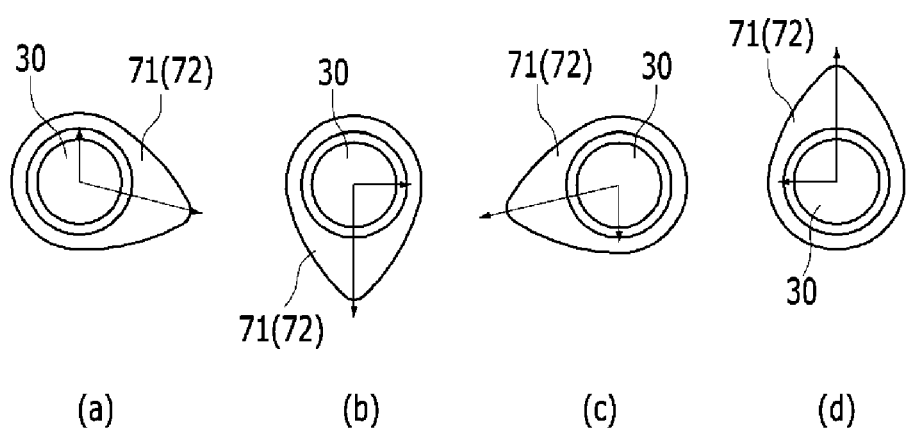

FIG. 8 and FIG. 9 are drawings showing mechanical motions of cams of a continuous variable valve timing apparatus according to various embodiments of the present invention.

According to engine operation states, an ECU (engine control unit or electric control unit) transmits control signals to the intake motor 106 of the intake control portion 100 to change a relative position of the intake slider housing 90.

In various embodiments of the present invention, the intake slider housing 90 moves left or right direction with respect to rotation center of the intake camshaft 30.

When the intake slider housing 90 moves to one direction with respect to the rotation center of the intake camshaft 30, the rotation speed of the intake cams 71 and 72 is relatively faster than rotation speed of the intake camshaft 30 from phase a to phase b and from phase b to phase c, then the rotation speed of the intake cams 71 and 72 is relatively slower than rotation speed of the intake camshaft 30 from phase c to phase d and from phase d to phase a as shown in FIG. 8.

When the intake slider housing 90 moves to opposite direction with respect to the rotation center of the intake camshaft 30, the rotation speed of the intake cams 71 and 72 is relatively slower than rotation speed of the intake camshaft 30 from phase a to phase b and from phase b to phase c, then the rotation speed of the intake cams 71 and 72 is relatively faster than rotation speed of the intake camshaft 30 from phase c to phase d and from phase d to phase a as shown in FIG. 9.

While the intake rotation ring 60 is rotated together with the intake camshaft 30, the intake ring key 62 is slidable within the intake ring key slot 81, the first intake pin 82 and the first intake sliding pin hole 86 are rotatable within the first intake sliding pin hole 86 and the second intake sliding pin hole 88 respectively and the intake cam key 74 is slidable within the intake cam key slot 83. Thus, when the relative rotation centers of the intake inner bracket 80 and the intake camshaft 30 are changed, the relative rotation speed of the intake cams 71 and 72 with respect to the rotation speed of the intake camshaft 30 is changed.

Figure 10:
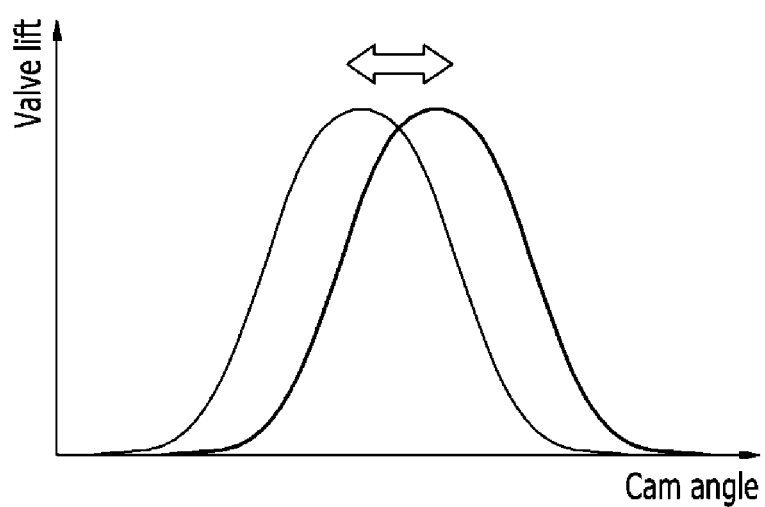
FIG. 10 is a graph of a valve profile of a continuous variable valve timing apparatus according to an exemplary embodiment of the present invention.

FIG. 10 is a graph of a valve profile of a continuous variable valve timing apparatus according to various embodiments of the present invention.

As shown in FIG. 10, although maximum lift of the intake valve 200 is constant, however rotation speed of the intake cam 71 and 72 with respect to the rotation speed of the intake camshaft 30 is changed according to relative positions of the intake slider housing 90 so that the opening timing of the intake valve 200 is changed.

Hereinafter, a CVVD (continuously variable valve duration apparatus) adjusting duration of an exhaust valve will be described in detail with reference to accompanying drawings.

Figure 12:
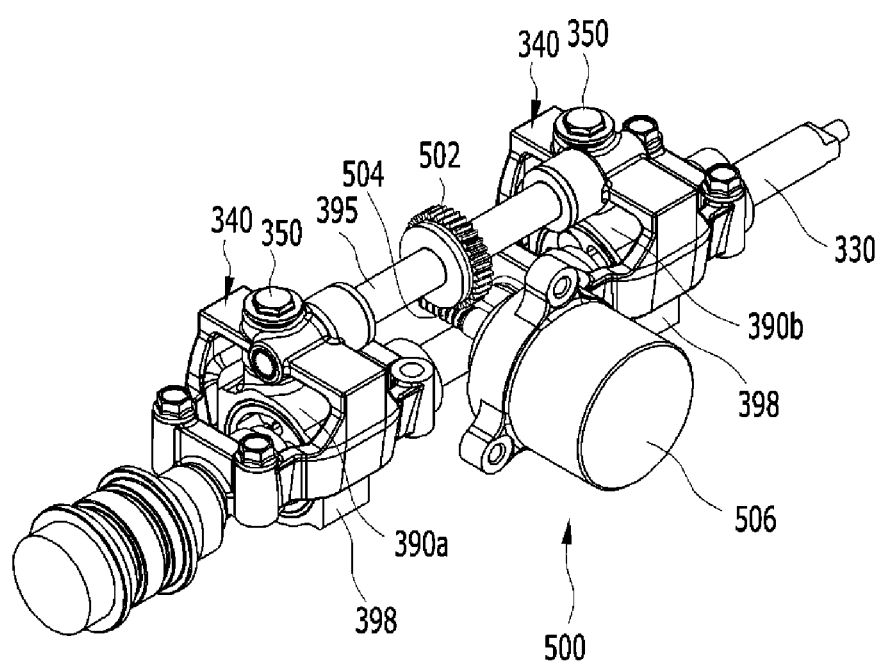
FIG. 12 is a perspective view of a continuous variable valve duration apparatus according to an exemplary embodiment of the present invention.

FIG. 11 is a perspective view of an engine provided with a continuous variable valve duration apparatus according to various embodiments of the present invention. FIG. 12 is a perspective view of a continuous variable valve duration apparatus according to various embodiments of the present invention.

Figure 13:
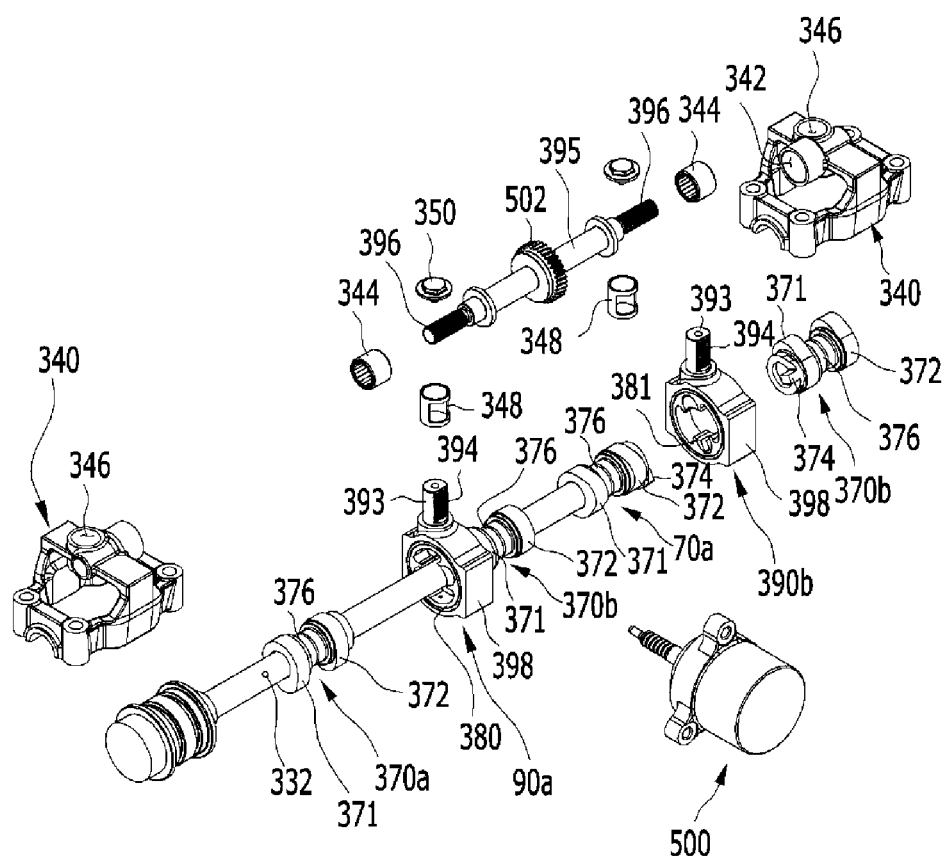
FIG. 13 and FIG. 14 are exploded perspective views of a continuous variable valve duration apparatus according to an exemplary embodiment of the present invention.
Figure 14:
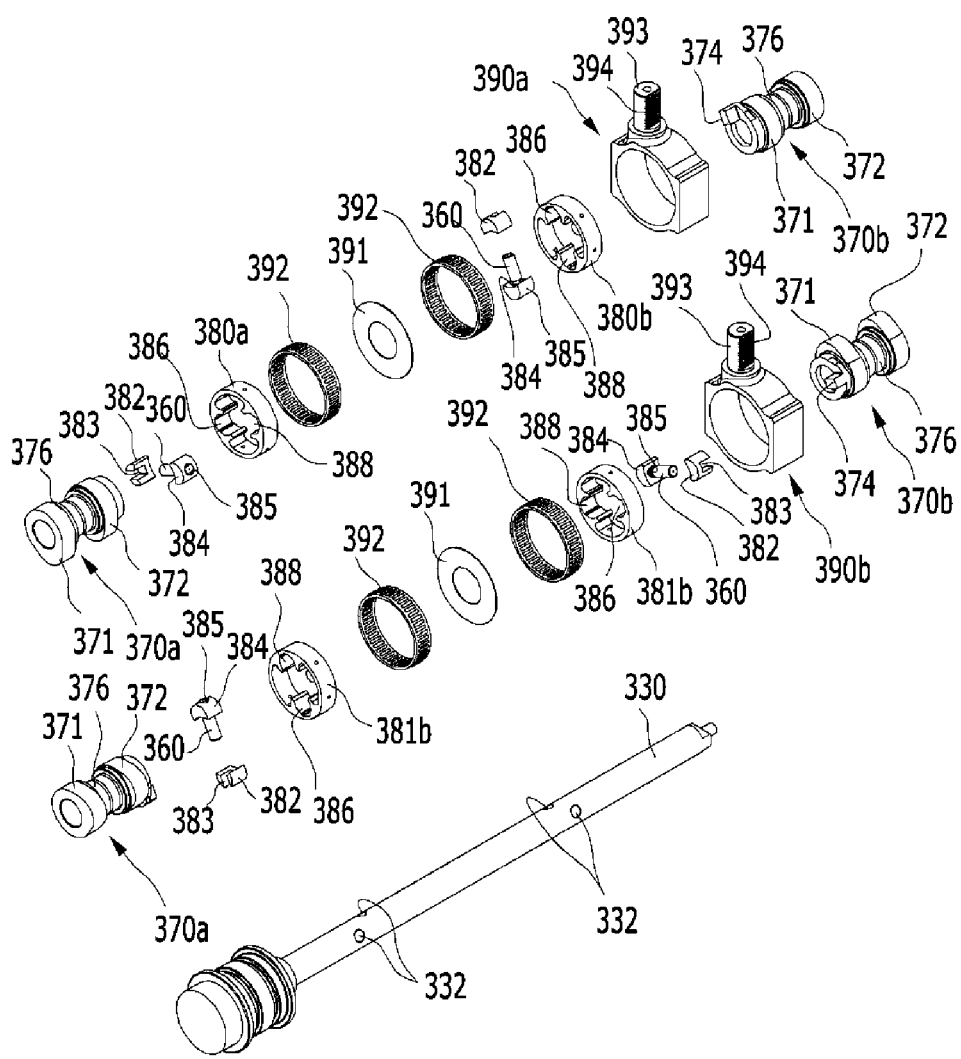
Figure 15:
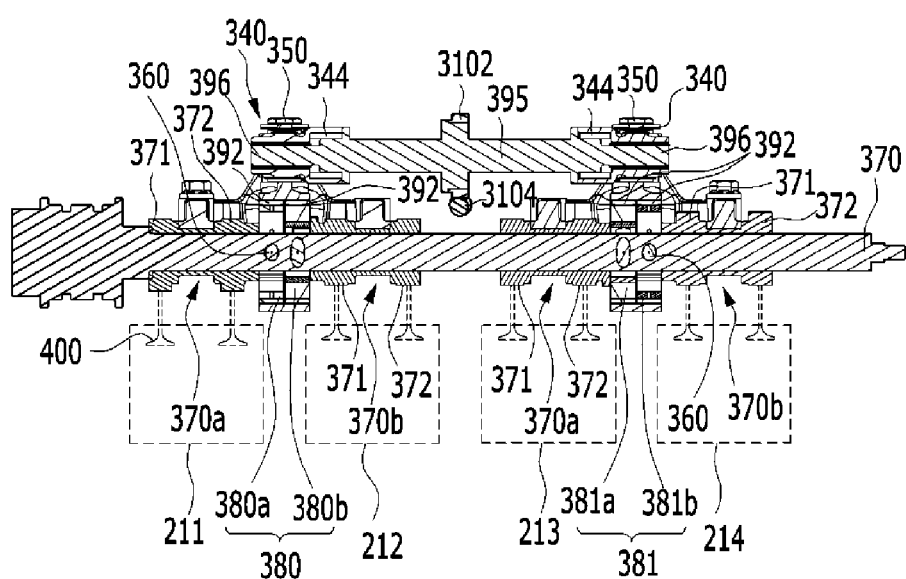
FIG. 15 is a cross-sectional view along line V-V of FIG. 11.
Figure 16:
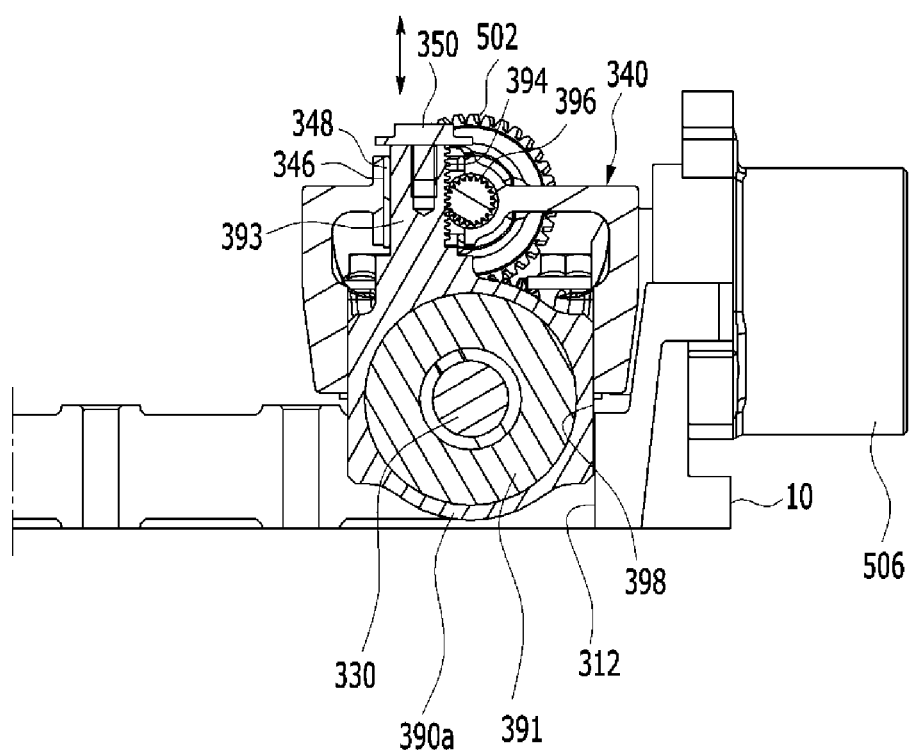
FIG. 16 is a cross-sectional view along line VI-VI of FIG. 11.

FIG. 13 and FIG. 14 are exploded perspective views of a continuous variable valve duration apparatus according to various embodiments of the present invention. FIG. 15 is a cross-sectional view along line V-V of FIG. 11. FIG. 16 is a cross-sectional view along line VI-VI of FIG. 11.

Referring to FIG. 1 to FIG. 6, an engine 10 according to various embodiments of the present invention includes a cylinder head 10 and a continuous variable valve duration apparatus mounted to the cylinder head 10.

The continuously variable valve duration apparatus according to various embodiments of the present invention includes an exhaust camshaft 330, first and second exhaust cam portions 370a and 370b of an exhaust cam 371 and 372 is formed thereto respectively, of which the exhaust camshaft 330 is inserted thereto and of which relative phase angles with respect to the exhaust camshaft 330 are variable, first and second exhaust inner brackets 380 and 381 transmitting rotation of the exhaust camshaft 330 to the first and second exhaust cam portions 370a and 370b respectively, first and second exhaust slider housings 390a and 390b of which the first and second exhaust inner brackets 380 and 381 are rotatably inserted thereto and of which relative position with respect to the exhaust camshaft 330 are variable, an exhaust cam cap 340 rotatably supporting the first and second exhaust cam portions 370a and 370b respectively and of which each exhaust slider housing 390a and 390b is slidably mounted thereto, an exhaust control shaft 395 disposed parallel to the exhaust camshaft 330 and engaged with the first and second exhaust slider housings 390a and 390b for selectively moving the first and second exhaust slider housings 390a and 390b, and an exhaust control portion 500 selectively rotating the exhaust control shaft 395 for changing positions of the exhaust inner brackets 380a and 380b.

The engine includes a plurality of cylinders 211, 212, 213 and 214, and the exhaust cam portions 370a and 370b are disposed corresponding to the each cylinder 211, 212, 213 and 214 respectively.

In the drawing, 4 cylinders are formed to the engine, but it is not limited thereto.

The exhaust camshaft 330 is an exhaust camshaft.

In the drawing, the exhaust cam 371 and 372, for driving exhaust valves 400, is formed as a pair, but it is not limited thereto.

To the exhaust cam portions 370a and 370b, an exhaust cam cap connecting portion 376 for engaged with the exhaust cam cap 340 is formed between the first and the second exhaust cams 371 and 372. The cylinder head 10 and the exhaust cam cap 340 are connected with each other and the exhaust cam cap connecting portion 376 is rotatably disposed between the exhaust cam cap 340 and the cylinder head 10.

The exhaust cam 371 and 372 rotate and open the exhaust valve 400.

An exhaust cam key 374 is formed to the first and second exhaust cam portions 370a and 370b respectively and an exhaust first sliding hole 386 and an exhaust second sliding hole 388 are formed to the first and second exhaust inner brackets 380 and 381 respectively.

An exhaust cam key pin 382 of which an exhaust cam key slot 383 where the exhaust cam key 374 is slidalby inserted therein is formed thereto and the exhaust cam key pin 382 is rotatably inserted into the each exhaust first sliding hole 386.

Exhaust camshaft holes 332 are formed to the exhaust camshaft 330 and a plurality of exhaust camshaft pin 360 is inserted into the exhaust camshaft hole 332 to be connected to the exhaust camshaft 330. And an exhaust slider pin 384 of which an exhaust camshaft pin slot 385 where the exhaust camshaft pin 360 is slidably inserted therein is formed thereto and the exhaust slider pin 384 is rotatably inserted into the each exhaust second sliding hole 388.

An exhaust slider housing bearing 392 is disposed between the exhaust slider housing 390a and 390b and the exhaust inner bracket 380 and 381 respectively. Thus, rotations of the exhaust inner brackets 380 and 381 may be easily performed. In the drawings, the exhaust slider housing bearing 392 is depicted as a needle bearing, however it is not limited thereto. On the contrary, various bearings such as a ball bearing, a roller bearing and so on may be applied thereto.

An exhaust shaft hole 342 where the exhaust control shaft 395 is inserted into is formed to the exhaust cam cap 340 and an exhaust shaft bearing 344 is inserted into the exhaust shaft hole 342 and rotatably supporting the exhaust control shaft 330.

An exhaust guide slot 346 is formed to the exhaust cam cap 340 and an exhaust guide shaft 393 inserted into the exhaust guide slot 346 and of which an exhaust rack gear 394 is formed thereto is protruded from the exhaust slider housings 390a and 390b.

An exhaust pinion gear 396 is formed to the exhaust control shaft 395 and engaged with the exhaust rack gear 394 and the positions of the exhaust slider housings 390a and 390b are changed according to rotation of the exhaust control shaft 395.

An exhaust bushing 348 is inserted into the exhaust guide slot 346 for reducing frictional force of the movement of the exhaust guide shaft 330.

An exhaust stopper 350 is disposed to the exhaust cam cap 340 for limiting the movement of the exhaust slider housings 390a and 390b.

The exhaust control portion 500 includes an exhaust worm wheel 502 connected to the exhaust control shaft 395, an exhaust worm gear 504 engaged with the exhaust worm wheel 502 and an exhaust control motor 506 selectively rotating the exhaust worm gear 504.

The exhaust first inner bracket 380 disposed within the first exhaust slider housing 390a may include two exhaust inner bracket elements 380a and 380b and each exhaust inner bracket element 380a and 380b may rotate independently.

The second exhaust inner bracket 381 disposed within the second exhaust slider housing 390b may include two exhaust inner bracket elements 381a and 381b and each exhaust inner bracket element 381a and 381b may rotate independently.

An exhaust partition 391 is disposed within the first and second exhaust slider housings 390a and 390b respectively for preventing from interrupting of the rotations of the exhaust inner brackets 380 and 381.

Thus, interrupting of the rotations of exhaust inner bracket element 380a, 380b, 381a and 381b may be prevented.

An exhaust guide surface 398 is formed to the first and second exhaust slider housings 390a and 390b and an exhaust guider 312 is formed to the cylinder head 10 for contacting the exhaust guide surface 398 and guiding movements of the first and second exhaust slider housings 390a and 390b.

As shown in FIG. 15, for example, an engine with a first, second, third and fourth cylinders 211, 212, 213 and 214 may be provided with two first and second exhaust cam portions 370a and 370b, two exhaust inner brackets 380 and 381, two exhaust slider housings 390a and 390b and one exhaust control motor 506 and perform changing duration of each exhaust cam 371 and 372. Thus, the continuously variable valve duration apparatus according to various embodiments of the present invention may reduce numbers of elements, thus durability may be improved and operation stability may be obtained.

Figure 17:
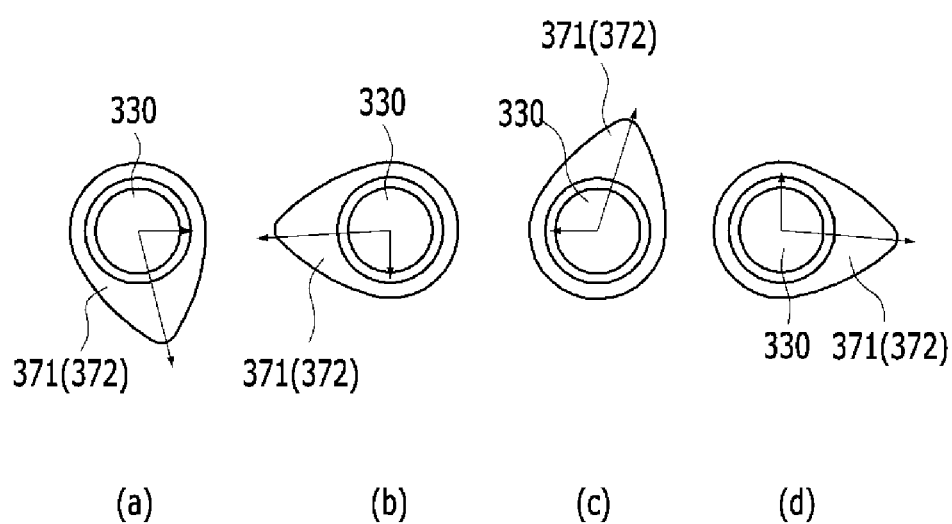
FIG. 17 and FIG. 18 are drawings showing mechanical motions of cams of a continuous variable valve duration apparatus according to an exemplary embodiment of the present invention.
Figure 18:
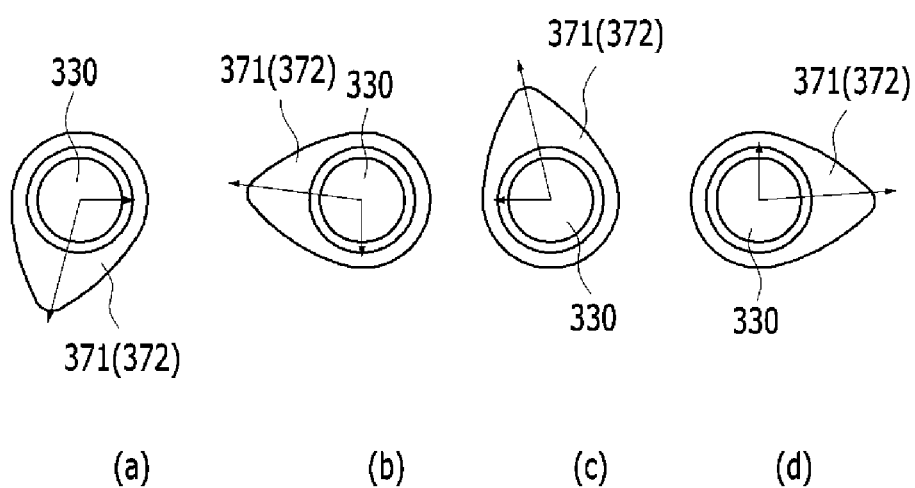

FIG. 17 and FIG. 18 are drawings showing mechanical motions of cams of a continuous variable valve duration apparatus according to various embodiments of the present invention.

As shown in FIG. 1 to FIG. 6, according to engine operation states, an ECU (engine control device or electric control device) transmits control signals to the exhaust control motor 506 of the exhaust control portion 500 to change the relative position of the first and second exhaust slider housings 390a and 390b upward or downward.

When the exhaust slider housings 390a and 390b and the exhaust inner brackets 380 and 381 moves according to operation of the exhaust control motor 506, rotation centers of the exhaust inner brackets 380 and 381 with respect to the exhaust camshaft 330 are changed.

As shown in FIG. 17, while the phase angle of the exhaust camshaft 330 is constantly changed when the relative rotation center of the exhaust cams 371 and 372 with respect to the rotation center of the exhaust camshaft 330 is changed downward, the rotation speed of the exhaust cams 371 and 372 is relatively faster than rotation speed of the exhaust camshaft 330 from phase a to phase b and from phase b to phase c, then the rotation speed of the exhaust cams 371 and 372 is relatively slower than rotation speed of the exhaust camshaft 330 from phase c to phase d and from phase d to phase a. That is, the valve duration is changed.

As shown in FIG. 18, while the phase angle of the exhaust camshaft 330 is constantly changed when the relative rotation center of the exhaust cams 371 and 372 with respect to the rotation center of the exhaust camshaft 330 is changed upward, the rotation speed of the exhaust cams 371 and 372 is relatively slower than rotation speed of the exhaust camshaft 330 from phase a to phase b and from phase b to phase c, then the rotation speed of the exhaust cams 371 and 372 is relatively faster than rotation speed of the exhaust camshaft 330 from phase c to phase d and from phase d to phase a. That is, the valve duration is changed.

While the exhaust camshaft pin 360 is rotated together with the exhaust camshaft 330, the exhaust camshaft pin 360 is slidable within the exhaust camshaft pin slot 385, the exhaust slider pin 384 is rotatably inserted into the exhaust second sliding hole 388, the exhaust cam key pin 382 is rotatably inserted into the first exhaust sliding hole 382, and the exhaust cam key 374 is slidable within the exhaust cam key slot 383. Thus the relative rotation speed of the exhaust cams 371 and 372 with respect to the rotation speed of the exhaust camshaft 330 is changed.

Figure 19:
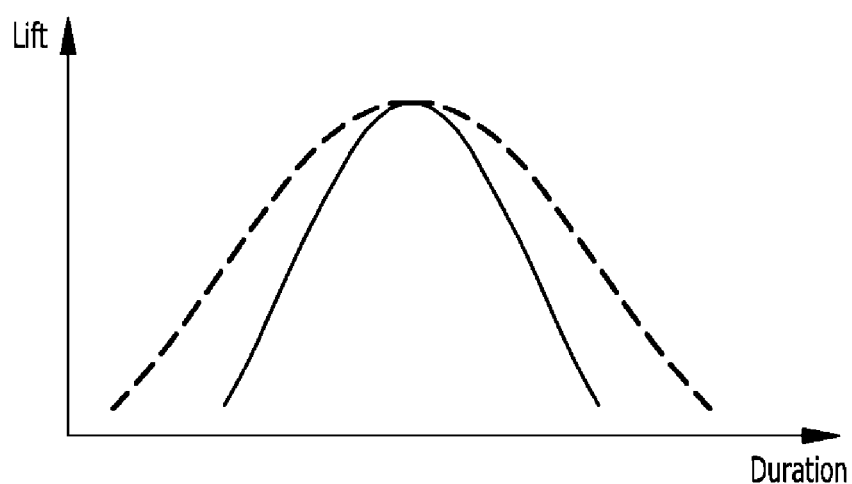
FIG. 19 and FIG. 20 are graphs of a valve profile of a continuous variable valve duration apparatus according to an exemplary embodiment of the present invention.
Figure 20:
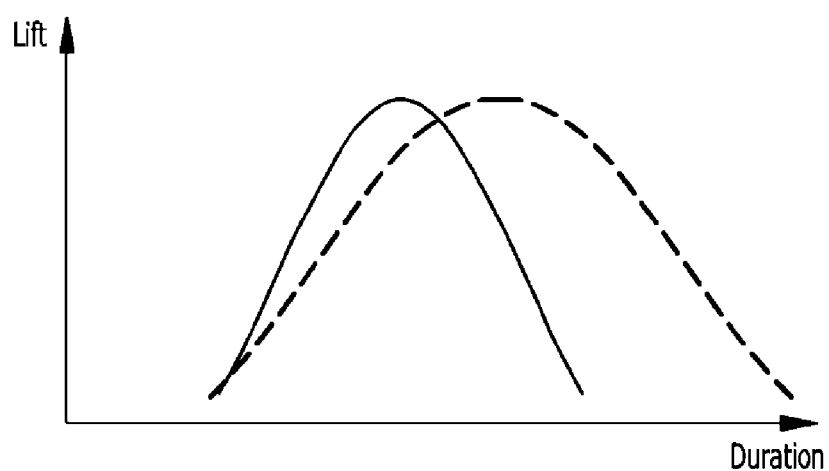

FIG. 19 and FIG. 20 are graphs of a valve profile of a continuous variable valve duration apparatus according to various embodiments of the present invention.

As shown in FIG. 19 and FIG. 20, although maximum lift of the exhaust valve 400 is constant, however rotation speed of the exhaust cam 371 and 372 with respect to the rotation speed of the exhaust camshaft 330 is changed according to relative positions of the exhaust slider housings 390a and 390b so that closing and opening time of the exhaust valve 400 is changed. That is, duration of the exhaust valve 400 is changed.

According to adjusting mounting angle of the exhaust valve 400, forming the exhaust guide surface 398 and the exhaust guider 312 and so on, valve duration may be enlarged by advancing opening timing and retarding closing timing of the exhaust valve 400 as shown in FIG. 19. Or, valve duration may be shortened by retarding opening timing and advancing closing timing of the exhaust valve 400.

Also, as shown in FIG. 20, opening timing of the exhaust valve 400 may be constant and closing timing of the exhaust valve 400 may be retarded or advanced as requested.

Also, closing timing of the exhaust valve 400 may be constant and opening timing of the exhaust valve 400 may be retarded or advanced as requested.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine comprising:
  an electric continuously variable valve timing apparatus for adjusting an opening timing of an intake valve provided at a cylinder head; and
  a continuously variable valve duration apparatus for adjusting a duration of an exhaust valve provided at the cylinder head,
  wherein the electric variable valve timing apparatus comprises:
    an intake camshaft;
    first and second intake cam portions, wherein each of the first and second intake cam portions has two intake cams formed thereto, the intake camshaft is inserted into the first and second intake cam portions, and relative phase angles of the first and second intake cam portions with respect to the intake camshaft are variable;
    first and second intake inner brackets transmitting rotation of the intake camshaft to the first and second intake cam portions respectively;
    first and second intake slider housings having the first and second intake inner brackets rotatably inserted therein, respectively, and having relative positions with respect to the intake camshaft that are variable;
an intake cam cap rotatably supporting the first and second intake cam portions together with the cylinder head, wherein the first and second intake slider housings are slidably mounted to the intake cam cap;
an intake control shaft disposed parallel to the intake camshaft and selectively moving the first and the second intake slider housings; and
an intake control portion selectively rotating the intake control shaft to change positions of the first and second intake inner brackets.

2. The engine of claim 1, further comprising an intake rotation ring mounted to the intake camshaft and having an intake ring key transmitting the rotation of the intake camshaft to the first intake earn portion and the second intake cam portion, respectively,
wherein an intake cam key is formed to the first and second intake cam portions respectively, and wherein rotation of the intake rotation ring is transmitted to the first and second intake cam portions through the first and second intake inner brackets respectively.

3. The engine of claim 2, further comprising:
first intake pins having intake ring key slots, each intake ring key slidably insertable to a corresponding intake ring key slot among the intake ring key slots; and
second intake pins having intake cam key slots, each intake cam key slidably insertable to a corresponding intake earn key slot among the intake cam key slots,
wherein a first intake sliding pin hole and a second intake sliding pin hole, of which the first intake pin and the second intake pin are inserted into respectively, are formed on the intake inner brackets.

4. The engine of claim 3, wherein
the first intake pin and the second intake pin are formed in a circular cylinder shape; and
the first intake sliding pin hole and the second intake sliding pin hole are formed for the first intake pin and the second intake pin to be rotated within the first intake pin and the second intake pin.

5. The engine of claim 4, wherein portions of the first intake sliding pin hole and the second intake sliding pin hole are open for movements of the intake ring key and the intake cam key to be uninterrupted.

6. The engine of claim 1, further comprising an intake bearing inserted between the first and second intake slider housings and the first and the second intake inner brackets.

7. The engine of claim 1, wherein
an intake cam cap connecting portion is farmed between the two intake cams of the intake earn portions; and
the intake cam cap connecting portion is rotatably disposed between the intake cam cap and the cylinder head.

8. The engine of claim 1, wherein the intake control portion comprises:
an intake worm wheel connected to the intake control shaft;
an intake worm gear engaged with the intake worm wheel; and
an intake control motor selectively rotating the intake worm gear; and
an intake eccentric protrusion is formed at an end of the intake control shaft, and an intake control hole where the intake eccentric protrusion is inserted therein is formed on the first and second intake slider housings; and the first and second intake slider housings move according to operation of the intake control motor.

9. The engine of claim 1, further comprising an intake sensor device detecting movements of the first and second intake slider housings, wherein the intake sensor device comprises:
an intake sensor plate mounted to the intake control shaft; and
an intake sensor detecting rotations of the intake sensor plate.

10. The engine of claim 1, wherein the continuously variable valve duration apparatus comprises:
an exhaust camshaft;
first and second exhaust cam portions of an exhaust cam formed thereto respectively, of which the exhaust camshaft is inserted thereto and of which relative phase angles thereof with respect to the exhaust camshaft are variable;
first and second exhaust inner brackets transmitting rotation of the exhaust camshaft to the first and second exhaust cam portions respectively;
first and second exhaust slider housings of which the first and second exhaust inner brackets are rotatably inserted thereto and of which relative positions thereof with respect to the exhaust camshaft are variable;
an exhaust cam cap rotatably supporting the first and second exhaust cam portions and of which each of the first and second exhaust slider housings is slidably mounted thereto;
an exhaust control shaft disposed parallel to the exhaust camshaft and engaged with the first and second exhaust slider housings for selectively moving the first and second exhaust slider housings; and
an exhaust control portion selectively rotating the exhaust control shaft for changing positions of the first and second exhaust inner brackets.

11. The engine of claim 10, wherein
an exhaust earn key is formed to the first and second exhaust cam portions respectively;
an exhaust first sliding hole is formed to the first and second exhaust inner brackets respectively; and
the continuous variable valve duration apparatus further comprises an exhaust cam key pin of which an exhaust cam key slot where the exhaust cam key is slidalby inserted therein is formed thereto and the exhaust cam key pin rotatably inserted into the exhaust first sliding hole of the first and second exhaust inner brackets.

12. The engine of claim 11,
wherein an exhaust second sliding hole is formed to the first and second exhaust inner brackets respectively, and
wherein the continuous variable valve duration apparatus further comprises;
a plurality of exhaust camshaft pins connected to the exhaust camshaft; and
an exhaust slider pin of which an exhaust camshaft pin slot where a corresponding exhaust camshaft pin is slidably inserted therein is thrilled thereto and the exhaust slider pin rotatably inserted into the exhaust second sliding hole of the first and second exhaust inner brackets.

13. The engine of claim 10, wherein an exhaust shaft hole where the exhaust control shaft is inserted into is formed OD the exhaust cam cap.

14. The engine of claim 10, wherein
an exhaust guide slot is formed to the exhaust cam cap;

an exhaust guide shaft inserted into the exhaust guide slot and on which an exhaust rack gear is formed protrudes from the first and second exhaust slider housings;

an exhaust pinion gear is formed on the exhaust control shaft and engaged with the exhaust rack gear; and the relative positions of the first and second exhaust slider housings are changed according to rotation of the exhaust control shaft.

15. The engine of claim 10, further comprising an exhaust slider housing bearing disposed between the first and second exhaust slider housings and the first and second exhaust inner brackets respectively.

16. The engine of claim 10, wherein the exhaust cam is formed as a pair to include a first exhaust cam and a second exhaust cam;

an exhaust cam cap connecting portion is formed between the first and second exhaust cams of the first and second exhaust cam portions; and the exhaust cam cap rotatably supports the exhaust cam cap connecting portion.

17. The engine of claim 10, wherein the exhaust control portion comprises:

an exhaust worm wheel connected to the exhaust control shaft;

an exhaust worm gear engaged with the exhaust worm wheel; and an exhaust control motor selectively rotating the exhaust worm gear.

18. The engine of claim 10, further comprising an exhaust partition disposed within the first and second exhaust slider housings respectively for preventing from interrupting of rotations of the first and second exhaust inner brackets.

* * * * *